(12) United States Patent
Higgs et al.

(10) Patent No.: US 7,454,689 B2
(45) Date of Patent: Nov. 18, 2008

(54) METHOD FOR DETECTING AND CORRECTING OPERATING DATA ERRORS

(75) Inventors: Raymond J. Higgs, Granby, CT (US); Richard P. Gonchar, Torrington, CT (US)

(73) Assignee: Carrier Corporation, Farmington, CT (US)

( * ) Notice: Subject to any disclaimer, the term of this patent is extended or adjusted under 35 U.S.C. 154(b) by 488 days.

(21) Appl. No.: 11/190,677

(22) Filed: Jul. 27, 2005

(65) Prior Publication Data

US 2007/0028156 A1 Feb. 1, 2007

(51) Int. Cl.
*H03M 13/00* (2006.01)

(52) U.S. Cl. .................. 714/777; 714/778; 714/758

(58) Field of Classification Search .............. 714/777, 714/774, 778, 750, 753, 758, 4; 398/1; 370/216
See application file for complete search history.

(56) References Cited

U.S. PATENT DOCUMENTS

| 7,149,947 | B1 * | 12/2006 | MacLellan et al. | 714/758 |
| 7,254,738 | B1 * | 8/2007 | Oh | 714/4 |
| 2002/0196735 | A1 * | 12/2002 | Hayes | 370/216 |
| 2005/0135803 | A1 * | 6/2005 | Lee et al. | 398/1 |

* cited by examiner

*Primary Examiner*—Rehana Perveen
*Assistant Examiner*—Fritz Alphonse
(74) *Attorney, Agent, or Firm*—Marjama Muldoon Blasiak & Sullivan LLP

(57) ABSTRACT

A method and apparatus can detect errors within an incorrect media access control address and can prevent an Ethernet device from using the incorrect media access control address while it is fully operating. The method and apparatus can also correct some types of errors within the media access control address so that the Ethernet device may operate using a correct media access control address.

7 Claims, 6 Drawing Sheets

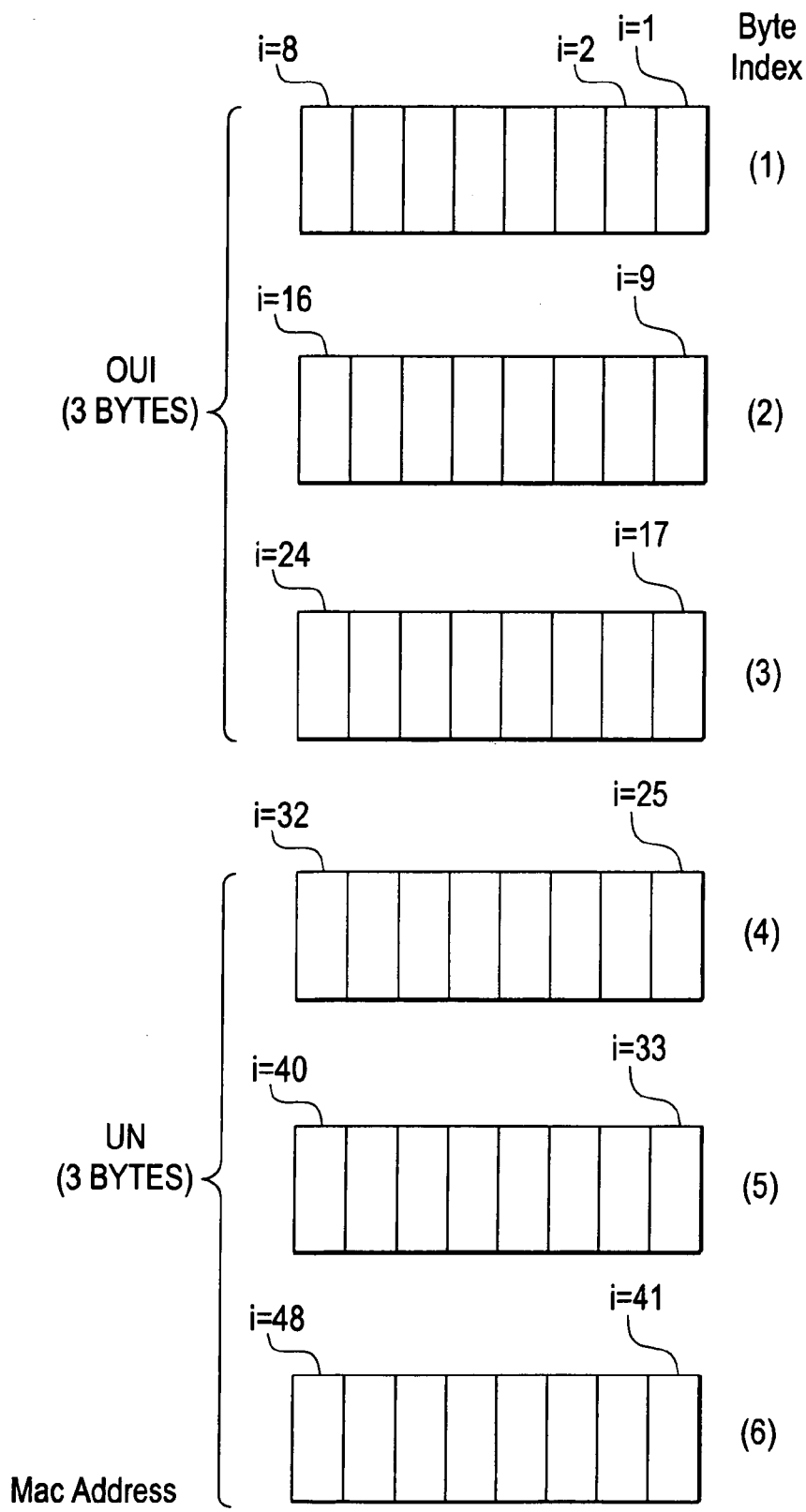

FIG. 2A

| Byte # | Bit # | P7 | P6 | P5 | P4 | P3 | P2 | P1 | P0 | Value |
|---|---|---|---|---|---|---|---|---|---|---|
| 1 | 1 |  |  |  |  |  | x | x | x | 07 |
|  | 2 |  |  |  |  | x |  | x | x | 0B |
|  | 3 |  |  |  |  | x | x |  | x | 0D |
|  | 4 |  |  |  |  | x | x | x |  | 0E |
|  | 5 |  |  |  | x |  |  | x | x | 13 |
|  | 6 |  |  |  | x |  | x |  | x | 15 |
|  | 7 |  |  |  | x |  | x | x |  | 16 |
|  | 8 |  |  |  | x | x |  |  | x | 19 |
| 2 | 9 |  |  |  | x | x |  | x |  | 1A |
|  | 10 |  |  |  | x | x | x |  |  | 1C |
|  | 11 |  |  | x |  |  |  | x | x | 23 |
|  | 12 |  |  | x |  |  | x |  | x | 25 |
|  | 13 |  |  | x |  |  | x | x |  | 26 |
|  | 14 |  |  | x |  | x |  |  | x | 29 |
|  | 15 |  |  | x |  | x |  | x |  | 2A |
|  | 16 |  |  | x |  | x | x |  |  | 2C |
| 3 | 17 |  |  | x | x |  |  |  | x | 31 |
|  | 18 |  |  | x | x |  |  | x |  | 32 |
|  | 19 |  |  | x | x |  | x |  |  | 34 |
|  | 20 |  |  | x | x | x |  |  |  | 38 |
|  | 21 |  | x |  |  |  |  | x | x | 43 |
|  | 22 |  | x |  |  |  | x |  | x | 45 |
|  | 23 |  | x |  |  |  | x | x |  | 46 |
|  | 24 |  | x |  |  | x |  |  | x | 49 |
|  |  | P7 | P6 | P5 | P4 | P3 | P2 | P1 | P0 |  |

FIG. 2B

| Byte | Bit# | P7 | P6 | P5 | P4 | P3 | P2 | P1 | P0 | Value |
|---|---|---|---|---|---|---|---|---|---|---|
| 4 | 25 |   | x |   |   | x |   | x |   | 4A |
|   | 26 |   | x |   |   | x | x |   |   | 4C |
|   | 27 |   | x |   | x |   |   |   | x | 51 |
|   | 28 |   | x |   | x |   |   | x |   | 52 |
|   | 29 |   | x |   | x |   | x |   |   | 54 |
|   | 30 |   | x |   | x | x |   |   |   | 58 |
|   | 31 |   | x | x |   |   |   |   | x | 61 |
|   | 32 |   | x | x |   |   |   | x |   | 62 |
| 5 | 33 |   | x | x |   |   | x |   |   | 64 |
|   | 34 |   | x | x |   | x |   |   |   | 68 |
|   | 35 |   | x | x | x |   |   |   |   | 70 |
|   | 36 | x |   |   |   |   |   | x | x | 83 |
|   | 37 | x |   |   |   |   | x |   | x | 85 |
|   | 38 | x |   |   |   |   | x | x |   | 86 |
|   | 39 | x |   |   |   | x |   |   | x | 89 |
|   | 40 | x |   |   |   | x |   | x |   | 8A |
| 6 | 41 | x |   |   |   | x | x |   |   | 8C |
|   | 42 | x |   |   | x |   |   |   | x | 91 |
|   | 43 | x |   |   | x |   |   | x |   | 92 |
|   | 44 | x |   |   | x |   | x |   |   | 94 |
|   | 45 | x |   |   | x | x |   |   |   | 98 |
|   | 46 | x |   | x |   |   |   |   | x | A1 |
|   | 47 | x |   | x |   |   |   | x |   | A2 |
|   | 48 | x |   | x |   |   | x |   |   | A4 |
| 7 | 49 | x |   | x |   | x |   |   |   | A8 |
|   | 50 | x |   | x | x |   |   |   |   | B0 |
|   | 51 | x | x |   |   |   |   |   | x | C1 |
|   | 52 | x | x |   |   |   |   | x |   | C2 |
|   | 53 | x | x |   |   |   | x |   |   | C4 |
|   | 54 | x | x |   |   | x |   |   |   | C8 |
|   | 55 | x | x |   | x |   |   |   |   | D0 |
|   | 56 | x | x |   |   |   |   |   |   | E0 |
|   |   | P7 | P6 | P5 | P4 | P3 | P2 | P1 | P0 |   |

FIG. 3

BYTE

| Bit # | 1 | 2 | 3 | 4 | 5 | 6 | 7 |
|---|---|---|---|---|---|---|---|
| 1 | 07 | 1A | 31 | 4A | 64 | 8C | A8 |
| 2 | 0B | 1C | 32 | 4C | 68 | 91 | B0 |
| 3 | 0D | 23 | 34 | 51 | 70 | 92 | C1 |
| 4 | 0E | 25 | 38 | 52 | 83 | 94 | C2 |
| 5 | 13 | 26 | 43 | 54 | 85 | 98 | C4 |
| 6 | 15 | 29 | 45 | 58 | 86 | A1 | C8 |
| 7 | 16 | 2A | 46 | 61 | 89 | A2 | D0 |
| 8 | 19 | 2C | 49 | 62 | 8A | A4 | E0 |

FIG. 4

```
UINT8 SYS_Calculate_ECC( UINT8 *DataPointer, UINT8 Length ) {
UINT8 BitMask;
UINT8 CalcECC;
UINT8 *ECCTablePtr;

CalcECC = 0;
   ECCTablePtr = (unsigned char *) ECCTable;

while ( Length-- )
   {
       BitMask = 1;
       do
       {
           if ( *DataPointer & BitMask )
               CalcECC = ((CalcECC | *ECCTablePtr) - (CalcECC &
               * ECCTablePtr));

BitMask <<=1;
           ECCTablePtr++;

} while (BitMask);
       DataPointer++;
   }
   return(CalcECC);
}
```

METHOD FOR DETECTING AND CORRECTING OPERATING DATA ERRORS

FIELD OF THE INVENTION

This invention relates generally to a method and apparatus for detecting and correcting errors within digitally encoded information, and specifically relates to detecting and correcting errors within a media access control (MAC) address employed by an Ethernet network device.

SUMMARY OF THE INVENTION

The invention provides a method and an apparatus for detecting errors within a defective media access control address and for preventing an Ethernet device from using the defective media access control address while it is fully operating. The method and apparatus can also correct some types of errors within the media access control address so that the Ethernet device may operate using a correct media access control address.

BACKGROUND OF THE INVENTION

Before its normal operation, an Ethernet device typically reads a stored media access control (MAC) address. During its normal operation, the Ethernet device employs the MAC address as its identifier while it communicates with other Ethernet addressable entities, such as with an Ethernet connected computer. An incorrect MAC address, such as one that has been corrupted before being read by the Ethernet device, interferes with the correct operation of the Ethernet device. To circumvent incorrect operation, an Ethernet device should be prevented from operating while using an incorrect MAC address.

BRIEF DESCRIPTION OF THE DRAWINGS

For a further understanding of these and objects of the invention, reference will be made to the following detailed description of the invention which is to be read in connection with the accompanying drawing, wherein:

FIG. 1 illustrates a 6-byte (48 bit) media access control (MAC) address consisting of a 3-byte organizationally unique identifier (OUI) and a 3-byte unique number (UN).

FIGS. 2A-2B collectively illustrate a parity bit grouping table 200 including 56 table entries.

FIG. 3 illustrates an error correction table 300 used to identify and correct 1-bit errors detected within input data, such as a MAC address, that is processed by the ECC algorithm.

FIG. 4 illustrates an embodiment of an algorithm to compute an error correction code (ECC) implemented as a C language function 400.

DETAILED DESCRIPTION OF THE INVENTION

Figure 2C:
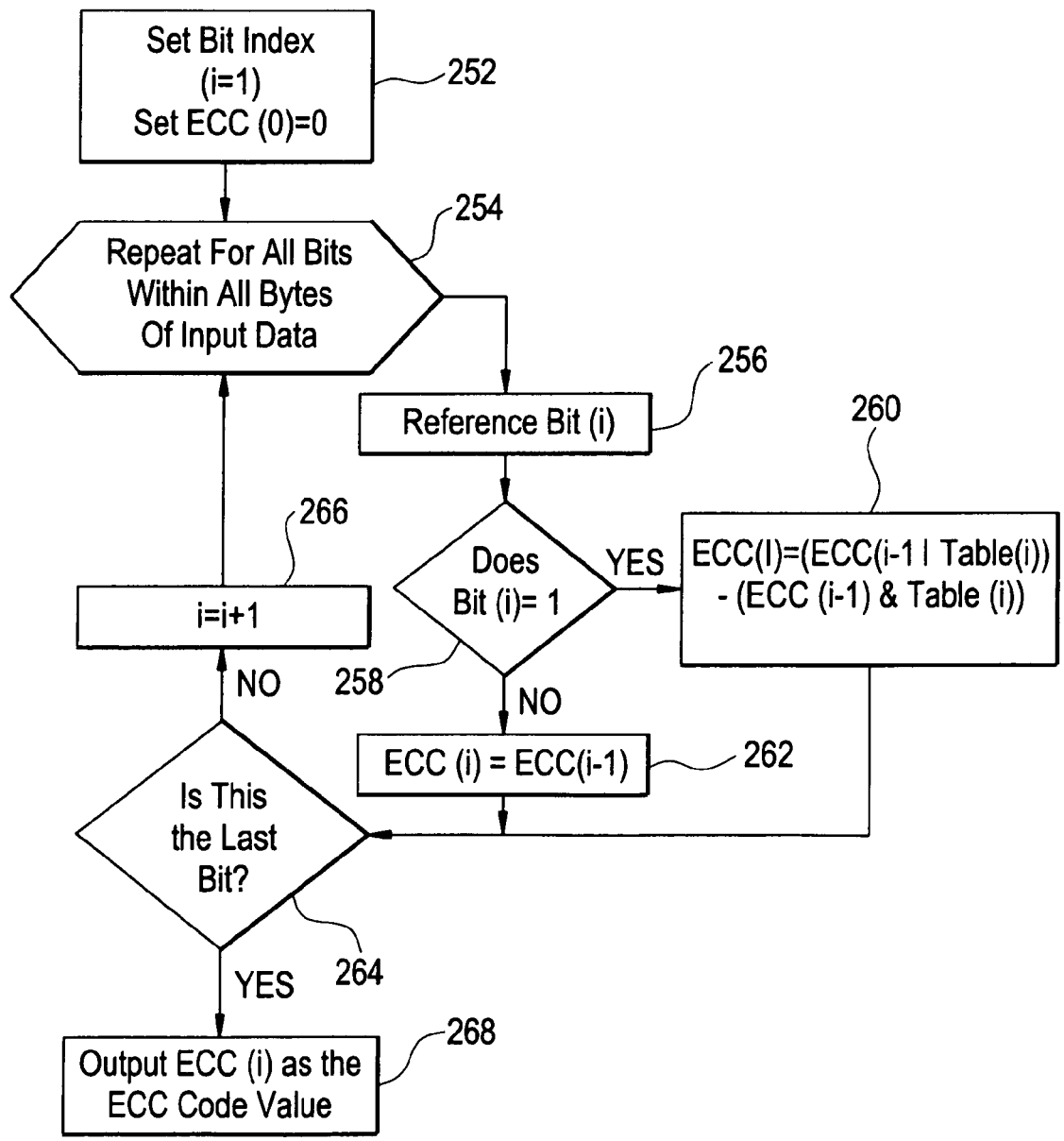
FIG. 2C is a flow chart that describes an embodiment of an algorithm to compute an error correction code (ECC).

FIG. 1 illustrates a representation of a 6-byte (48 bit) media access control (MAC) address consisting of a 3-byte organizationally unique identifier (OUI) followed by a 3-byte unique number (UN). The MAC address constitutes input data for processing by an error correction code algorithm in accordance with the invention. For simplicity, each byte located within the OUI and the UN is shown as being arranged from a lowest order (lowermost) byte to highest order (uppermost) byte. The OUI, shown as the highest order (uppermost) three bytes, specifically byte index numbers 1, 2 and 3, of the MAC address, is a unique identifier for an organization. The UN, shown as the lowest order (lowermost) three bytes of the MAC address, specifically byte index numbers 4, 5, and 6, is a unique number associated with the organization identified by the OUI.

Typically, both the OUI and UN are stored and transmitted in most to least significant byte order, where the first byte stored and transmitted is the high order byte of the OUI ((byte 1) of FIG. 1) and the last byte stored and transmitted is the low order byte of the UN ((byte 6) of FIG. 1). Accordingly, the storage and transmission of the OUI and UN is sequenced as bytes 1, 2, 3, 4, 5 and 6 of FIG. 1, in that order.

Note that program address space addresses increase from byte index number 1 to byte index number 6. As a result, byte index number 1 resides at the lowest program memory address and byte index number 6 resides at the highest memory address of the MAC address as it is stored within program address space. Also, note that the rightmost bit represents the lowest order bit and the leftmost bit represents the highest order bit within each byte.

In other embodiments, the bytes of the OUI/UN input data and the bits within each byte of the OUI and/or UN data may be stored and ordered differently within program address space, than that shown in FIG. 1. For example, higher order bytes can be located in higher instead of lower program address space. Also for example, low order bits within each byte can be located towards the left side direction of each byte while the high order bytes remain located towards the upper direction (lower program address space) of the input data, or vice versa.

The invention does not restrict the storage and/or transmission of OUI and/or UN data to any particular byte order or bit order. Further, the invention does not restrict the reading and/or processing of OUI/UN data in any particular byte order or bit order to generate an ECC value. However, the invention does require the selection and processing of a particular and consistent byte order and bit order of the OUI/UN data to generate each ECC value, so that a consistent ECC value is generated for a particular set of OUI and UN data values.

A MAC address uniquely identifies an Ethernet enabled device. Each of the six MAC address bytes includes one set of eight bits. Hence, the MAC address includes 48 bits. As shown, each set of eight bits, is indexed from the lowest order (rightmost) bit to the highest order (leftmost) bit. Each of the 48 bits of the MAC Address is uniquely identified by a bit index value (i) ranging from (i=1) (rightmost bit of byte index number 1) to (i=48) (leftmost bit of byte index number 6).

In one embodiment, the invention provides a method and an apparatus for validating the integrity (correctness) of data, such as data representing a MAC address. In another embodiment, the invention provides a method and an apparatus for correcting errors within data representing a MAC address. In another aspect, the invention provides a method for preventing a device, such as an Ethernet device, from operating while relying upon incorrect data, such as data representing a MAC address.

In one type of embodiment, a MAC address is validated by computing a first and a second error correction code (ECC). The first ECC is stored in association with a stored MAC address. Before an Ethernet device enters a fully operational state, the second ECC is computed based upon the stored MAC address. The first ECC and the second ECC are compared. The result of the comparison indicates whether the stored MAC address is correct, or whether the stored MAC address is incorrect but correctable by the method of the invention, or whether the stored MAC address is incorrect and un-correctable by the method of the invention.

In one type of embodiment, the comparison between the first and the second ECC is an EXCLUSIVE OR operation. If the result of the EXCLUSIVE OR operation equals zero, then the MAC address is classified as correct. If the result of the EXCLUSIVE OR operation is a non-zero value including only one bit set, then there is likely an error within the first ECC value. If the result of the EXCLUSIVE OR operation is a non-zero value including only two bits set, then there is likely an uncorrectable 2-bit error within the input data, namely the MAC address. If the result of the EXCLUSIVE OR is a non-zero value including only three bits set, then there is likely a single bit correctable error within the input data (MAC address). If the value of the EXCLUSIVE OR is a non-zero value including four or more bit sets, then there is likely an uncorrectable 3 or more bit error within the input data (MAC address).

FIGS. 2A-2B collectively illustrate a parity bit grouping table 200 which contains 56 table entries (one line per entry). Each table entry identifies a possible combination of 3 parity bit locations within a 1-byte (8 bit) error correction code (ECC) value. The parity bit grouping table 200 is also referred to as an ECC table.

In some embodiments, an ECC algorithm processes input data of size up to and including 56 bits (7 bytes) in length and generates an error correction code that is 8 bits (1 byte) in length. In this type of embodiment, the ECC algorithm employs a table of 56 table entries. Each table entry (line) is an 8 bit quantity (byte) that has 3 of its 8 bits set to a value of one and the remaining 5 bits set to zero. Each table entry, as compared to the other 55 table entries of the table 200, has a unique set of three bits that are each set to a value of one while the remaining five bits of the byte are set to a value of zero. The table 200 includes every possible combination of 3 bits out of 8 bits that can be set to a value of one.

FIG. 2C is a flowchart that describes an embodiment of an algorithm to compute an error correction code (ECC). In one type of embodiment, the ECC algorithm processes a MAC address as input data, in the following manner. The ECC algorithm reads and processes the value of each of the 48 bits of the MAC address. All 48 MAC address bits are read and processed in an order from lowest order byte to highest order byte and from lowest order bit to highest order bit within each of all the 6 bytes of the MAC address.

At step 252, a bit index (i) is set to a value of one (i=1) and an initial ECC code, represented as ECC (0) is set to a value of zero (ECC (0)=0). At step 254, the algorithm enters a loop procedure that is executed for each bit of input data. For the 48 bits of the MAC address, this procedural loop is exercised 48 times, one procedural loop is exercise for each of the 48 bits of the MAC address. At step 256, the current bit index is used to index (reference) the current bit of the 48 bits of the MAC address.

At step 258, the value of the current bit, indexed by the value of the current bit index (i), is tested. If the value of current bit is equal to a value of zero, the ECC (i) is set to the value of ECC (i−1) in step 262. Else, if the value of current bit is equal to a value of one, ECC(i) is computed in step 260 using the following mathematical operation.

ECC (i)=(ECC (i−1)|TABLE (i))−((ECC (i−1) & TABLE (i))

Where ECC (0)=0, and where ECC (i−1) is the ECC value computed for the previous current bit and where TABLE (i) is the parity bit grouping (ECC) table entry (i), namely the ECC table entry indexed by the value (i).

Next, in step 264, if the current bit index references the last bit of the input data, go to step 268 where the ECC (i) value is output as the final computed ECC value for the input data. The ECC (48) value is a final computed ECC value in circumstances where a MAC address is processed as input data.

Else, if the current bit index does not reference the last bit of the input data, go to step 266 where the current bit index is incremented by the value of one (i=i+1) and step 254 is repeated to exercise the procedural loop for each of any remaining bits of the input data.

For example, to exercise step 260, for a bit index of (i=1)

ECC (1)=((ECC (0)|TABLE (1))−(ECC (0) & TABLE (1))

Substituting the value of TABLE (1)=0x07; (See FIG. 2A)

ECC(1)=(0|0x07)−(0 & 0x07)=0x07−0=0x07

Alternatively, when the current bit is the first bit of input data (i=1), if the value of the current bit equals 0, then go to step 262, where ECC(i)=ECC(i−1) and hence, ECC(1)=ECC (0)=0.

The calculation of ECC for current bit (i=1) is complete. If the value of the current bit for bit index (i=1) equals 1, then ECC(L)=0x07. If the value of the current bit for bit index (i=1) equals 0, then ECC 1=0x00.

When a MAC address is used as input data, repeat this procedure until all 48 bits of the MAC address are processed. The ECC(48) value represents the final computed ECC for the 48 bit MAC address.

As an example, a MAC address of the value 0x00203040506, includes an OUI value of 0x010203 and a UN value of 0x040506, is equal to the following bit pattern of Byte 1, bits 8->1 00000001
Byte 2, bits 16->9 00000010
Byte 3, bits 24->17 00000011
Byte 4, bits 32->25 00000100
Byte 5, bits 40->33 00000101
Byte 6, bits 48->41 00000110

Applying the ECC algorithm to the above listed bits, from the rightmost bit (i=1) to the leftmost bit(i=48), the ECC values computed up to and including a particular bit index () are listed as follows:

ECC(0)=0
ECC(8)=0x07
ECC(16)=0x1B
ECC(24)=0x63
ECC(32)=0x3B
ECC(40)=0x37
ECC(48)=0x34

As described earlier, the computed ECC (48) value that is computed upon processing the value of the forty-eighth and last bit of the MAC address, is a complete ECC value for the MAC address, and can constitute the first ECC value that is computed and stored into non-volatile memory using an initial (correct) MAC address of value 0x010203040506 as input data. At a later time, before the device is permitted to fully operate, a second complete ECC value is computed using the stored MAC address value as input data to the ECC algorithm to compute the second ECC value.

The first ECC and the second ECC values are compared. If the first ECC and the second ECC are equal, then the stored MAC address has not changed during the time of its storage in non-volatile memory and is classified as correct and the device is permitted to fully operate. If the first ECC value and the second ECC value are not equal, then the MAC address has changed during the time of its storage in non-volatile memory and is classified as not correct and the device is not permitted to fully operate.

In one embodiment, an EXCLUSIVE OR operation is used to compare the first and the second ECC. If the result of the EXCLUSIVE OR operation equals 0, then the first ECC and the second ECC are equal. If the result of the EXCLUSIVE OR operation is not equal to 0, then the first ECC and the second ECC are not equal.

FIG. 3 illustrates an error correction table 300 used to identify and correct 1-bit errors detected within input data, such as a MAC address, that is processed by the ECC algorithm. As shown, the table 300 has 7 columns and 8 rows and 56 entries. Each entry is represented by a hexadecimal value. Each column of the error correction table 300 corresponds to one of up to (7) bytes of input data that is input and processed by the ECC algorithm. Each row of the error correction table 300 corresponds to a bit within each of the up to (7) bytes of input data.

If the result of the EXCLUSIVE OR operation equals a value of one of the entries in the error correction table 300, then the location of that entry, also referred to as a matching entry, within the error correction table 300 indicates the location of an incorrect bit, that is a bit within the input data that has an incorrect value. Reversing the value of the incorrect bit that corresponds to the location of the matching entry within the error correction table 300, corrects the incorrect bit value, and hence, can correct the MAC address as input data.

For example, if the result of the EXCLUSIVE OR operation equals 43 (hex), the entry in column 2 and row 5 of the table 300 equals (matches) the result of the EXCLUSIVE OR operation. The location of the matching entry corresponds to the fifth bit (row) of the third byte (column) of the input data. The incorrect bit is located as the fifth bit of the third byte of input data. Reversing the value of the fifth bit of the third byte of the input data, corrects the detected error within the input data, and hence corrects the MAC address.

If the input data includes only one incorrect bit, then correcting the one incorrect bit corrects the input data. The result equals 43 (hex) is expressed as 0100 0011 (binary) having 3 and only 3 bits set. Hence, in accordance with the design of the ECC algorithm, it is likely that the incorrect bit is the only incorrect bit within the input data and hence, correcting the incorrect bit removes all errors from the input data and the MAC address that constitutes input data.

FIG. 4 illustrates an embodiment of an algorithm to compute an error correction code (ECC) implemented as a C language function 400. The C language function 400 is named SYS_Calculate_ECC and is programmed to process a DataPointer variable 410 and a Length 412 variable as parameters. The CalcECC variable 490 represents a finally computed ECC value, that is processed from the input data and that is returned by the SYS_Calculate_ECC function 400.

The DataPointer variable 410 stores an address of a byte within the input data processed by the function 400. The Length variable 412 stores the length of the input data as a byte count. The input data can include a MAC address and/or data representing other types of information. An ECCTable variable 420 stores an address of the start of the parity bit grouping table 200. An ECCTablePtr variable 422 stores an address of an entry within the parity bit grouping table 200. A BitMask variable 430 is used to test the value of each bit within each byte of input data. The function 400 returns upon computing a complete ECC value 490.

The objects and features of the invention are understood with reference to the claims and drawings described above. The drawings are not necessarily to scale, emphasis instead generally being placed upon illustrating the principles of the invention. In the drawings, like numerals are used to indicate like parts throughout the various views. Significant differences between like parts may cause those parts to be indicated by different numerals. Unlike parts are indicated by different numerals.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method for preventing an Ethernet device from operating while using an incorrect media access control address, comprising the steps of:
   before an Ethernet device is fully operational, computing a first error correction code (ECC) value based upon an initial media access control address that is assigned to the Ethernet device;
   storing into non-volatile memory, the media access control address and the first error correction code, said media access control address being accessible to said Ethernet device;
   validating the stored media access control address by computing a second error correction code based upon the media access control address stored into non-volatile memory; computing a value representing a result of comparing the second error correction code against the first error correction code; and
   if the value indicates that an uncorrectable error exists within the media access control address, then performing the step of preventing the Ethernet device from becoming fully operational.

2. The method of claim 1 where if the value indicates a correctable error within the media access control address, correcting media access control address and permitting the Ethernet device to become fully operational.

3. The method of claim 1 where if the value indicates an error within the first error correction code, preventing the Ethernet device from becoming fully operational.

4. The method of claim 1 where the first and second error correction codes are computed as a type of Hamming code.

5. The method of claim 4 where said error correction codes are configured so that each possible single bit error within the media access control address affects a unique set of three parity bits within said error correction codes.

6. The method of claim 1 where the step of comparing between the second error correction code and the first error correction code is performed by computing an exclusive OR operation between the second error correction code and the first error correction code.

7. An apparatus for preventing an Ethernet device from operating while using an incorrect media access control address, comprising:
   an error correction code generator, said error correction code generator computing a first and a second error correction code based upon a correct media access control address assigned to an Ethernet device;
   an error correction code storage memory, said error correction code storage memory configured to store at least the media access control address and the first error correction code;
   an error correction code comparator, said error correction code comparator configured to compute a value representing a result of comparing the second error correction code against the first error correction code;
   an Ethernet device operating gate, said Ethernet device operating gate configured to prevent the Ethernet device from becoming fully operational if the value indicates an uncorrectable error within the media access control address or within the first or second error correction code.

* * * * *